E. P. QUIRAM.
RECORDING SCALE.
APPLICATION FILED JUNE 8, 1917.
1,267,693.
Patented May 28, 1918.
2 SHEETS—SHEET 1.
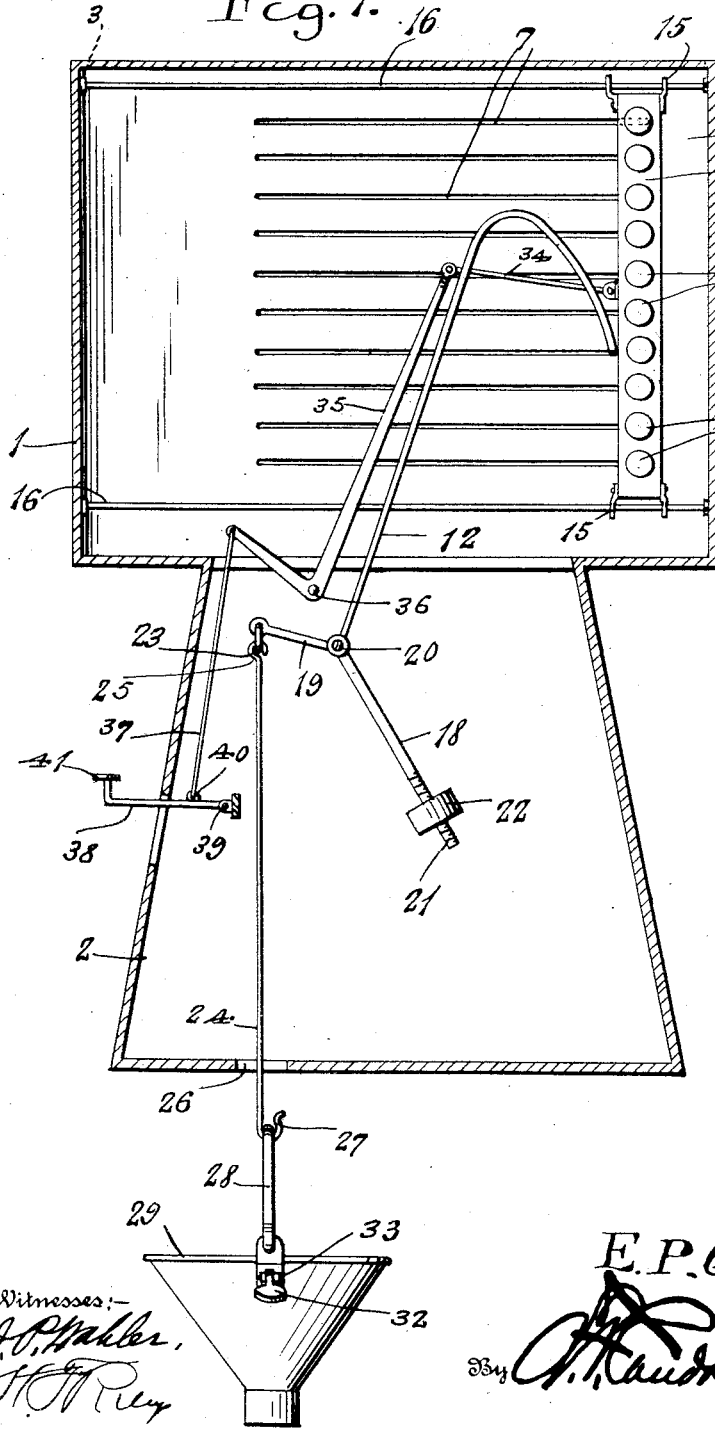

E. P. QUIRAM.
RECORDING SCALE.
APPLICATION FILED JUNE 8, 1917.
1,267,693.
Patented May 28, 1918.
2 SHEETS—SHEET 2.
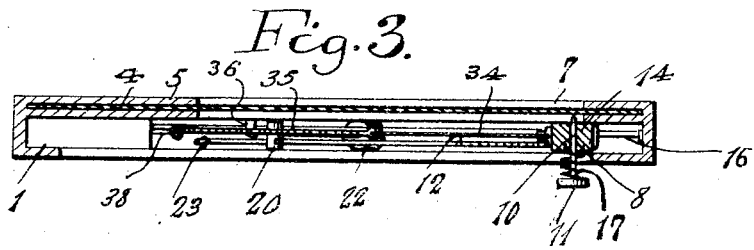
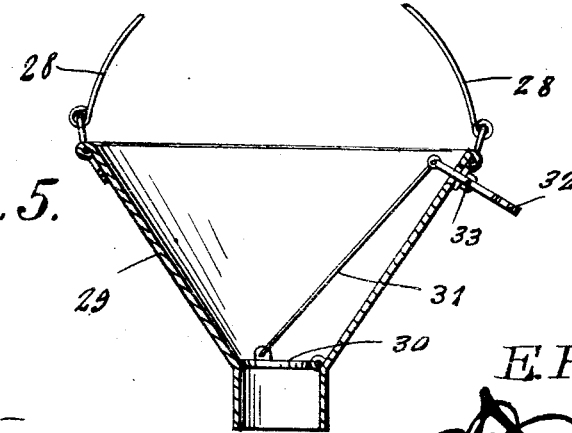

UNITED STATES PATENT OFFICE.

EMIL P. QUIRAM, OF ELYSIAN, MINNESOTA.

RECORDING SCALE.

1,267,693.

Specification of Letters Patent.

Patented May 28, 1918.

Application filed June 8, 1917. Serial No. 173,596.

*To all whom it may concern:*

Be it known that I, EMIL P. QUIRAM, a citizen of the United States, residing at Elysian, in the county of Lesueur and State of Minnesota, have invented certain new and useful Improvements in Recording-Scales; and I do hereby declare the following to be a full, clear, and exact description of the invention, such as will enable others skilled in the art to which it appertains to make and use the same.

The invention relates to a recording scale.

The object of the present invention is to provide a simple, practical and efficient recording scale of strong, durable and inexpensive construction designed for the weighing of milk of cows and the making of a record of the milk given by each cow and for a variety of other purposes, and capable of indicating the weight of an article and of enabling marking mechanism to be readily brought into a position corresponding with that of the weighing mechanism for punching on a chart sheet the weight of the milk or other article weighed.

A further object of the invention is to provide a recording scale of this character adapted to enable chart sheets to be readily introduced into and removed from it, so that the record of each day or other time may be obtained.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Figure 1 is a front elevation partly in section of a recording scale constructed in accordance with this invention.

Fig. 2 is a vertical sectional view of the same.

Fig. 3 is a horizontal sectional view through the upper portion of the device.

Fig. 4 is an elevation of one of the chart sheets.

Fig. 5 is a sectional view of the strainer.

Like numerals of reference designate corresponding parts in the several figures of the drawings.

In the accompanying drawings, in which is illustrated the preferred embodiment of the invention, the recording scale comprises in its construction a frame or casing composed of an upper rectangular chart-receiving portion 1 and a lower portion or housing 2, preferably tapered, as shown. The upper rectangular portion, which is composed of a rear wall and top, bottom and side walls, is provided in its top wall with a slot 3 for the introduction of a chart sheet 4, which is arranged between the rear wall and a metallic plate 5 spaced from the rear wall a sufficient distance to provide an intervening space 6 for the chart sheet. The rear wall and the plate 5, which may be constructed of any other suitable material, are provided with slots 7 and 8 disposed horizontally in alinement and adapted to permit the chart, which is divided off into squares 9, to be pierced by stems 10 of a series of buttons 11 for indicating on the chart sheet the number of pounds of milk given by a number of cows. The chart sheet 4 is ruled by vertical and horizontal lines into the squares which are numbered from one to fifteen in horizontal rows, the numbering commencing at the right hand side of the sheet and extending to the left and increasing from right to left in the direction of the movement of a hand or pointer 12 of weighing mechanism hereinafter described. The horizontal lines are extended at the left beyond the vertical lines to provide spaces 13 for the names of the cows. The spaces 13 form a vertical column and are numbered, ten being shown in Fig. 4 of the drawings, but any desired number may of course be employed, and the number of pounds, while being carried to fifteen in the accompanying drawings, may of course be varied to suit the requirement. Also while the scale is adapted to be advantageously employed for measuring and recording the amount of milk given by cows, it may be used for various other purposes where a record of this character is desired to be obtained and retained so that the profits on individual cows may be readily calculated.

The push buttons are mounted on a shiftable bar or member 14 provided at its ends with perforated lugs or eyes 15 arranged in pairs and slidably receiving upper and lower rods 16, which are suitably mounted within the casing at the upper and lower portions thereof. The rods form rigid stationary guides for the shiftable bar or member 14 which extends from the top to the bottom of the upper portion of the casing. The buttons are adapted to be forced inwardly or rearwardly to cause their stems to pierce the record sheet, and the buttons are moved outwardly after being forced inwardly, by means of coiled springs 17 mounted on the stems and suitably secured to the shiftable bar or member 14 and the buttons. By this construction the buttons will be maintained in proper position to enable them to be readily pressed by the operator for piercing the chart sheet.

The weighing mechanism comprises in its construction a lever having angularly related arms 18 and 19 and carrying the pointer or indicator 12 which is arranged at an angle to the arms 18 and 19. The lever of the weighing mechanism is fulcrumed within the lower portion of the casing on a suitable pivot 20 and one of its arms, the arm 18, is threaded at 21 for the reception of an adjustable weight 22 which is adapted to be moved inwardly and outwardly on the arm 18. The other arm 19 is provided with a pendent link 23 from which depends a rod 24 provided at its upper end with a hook 25 for engaging the said link 23. The rod 24, which extends downwardly through an opening 26 of the bottom of the lower portion 2 of the frame or casing, has a supporting hook 27 which is adapted to receive the bail 28 of a strainer 29, but any other suitable receptacle for holding the material or goods to be weighed may of course be employed. The strainer is equipped at the lower portion with a hinged valve 30 which is connected by a rod 31 with an operating lever 32 fulcrumed on the strainer at the upper portion thereof by a suitable pivot 33 and extending through a slot or opening in the wall of the strainer, as clearly shown in Fig. 5 of the drawings.

The shiftable button carrying or punch carrying bar is connected by a link 34 with one arm of an angle lever 35 fulcrumed at its angle at 36 and having its other arm connected by a link or rod 37 with an operating key or lever 38. The operating key or lever 38 is fulcrumed at its inner end at 39 and is connected at a point intermediate of its ends at 40 with the lower end of the rod or link 37 and is provided at its outer end with a head 41. By moving the lever or key 38 downwardly, the slidable bar 14, which carries the marking devices, is moved in the direction of the hand or pointer 12 in the weighing movement of the same, and the marking devices may be readily brought opposite the vertical column of squares indicated by the hand or pointer of the scale. After weighing operation the scale returns automatically to its normal position and the marking device is moved back to its initial position through an upward movement of the key or operating lever. The metallic sheet or plate, which forms a pocket for the chart sheet, may be mounted in the upper portion of the frame or casing in any desired manner and it is adapted to prevent the marking devices from accidentally catching on the chart sheet when the bar or member 14 is shifted forwardly or backwardly.

What is claimed is:

1. A recording scale of the class described including a frame or casing provided with means for holding a chart sheet, weighing mechanism having a hand or pointer arranged to swing across the chart sheet, and marking mechanism operable manually and also movable across the chart sheet to position it contiguous to the hand or pointer, said marking mechanism being provided with manually operable marking means.

2. A recording scale of the class described including a casing having a pocket adapted to receive a chart sheet and provided with openings to permit the said sheet to be punched, weighing mechanism having a hand or pointer movable over the sheet, a slidable member also movable over the said sheet and provided with a plurality of punchers operable to pierce the said sheet, and means for sliding the member backwardly and forwardly to arrange the same at the point indicated by the weighing mechanism.

3. A recording scale including a frame or casing adapted to receive a chart sheet and provided with guiding means, a slidable member guided by the said means and provided with a plurality of marking devices, weighing mechanism having a hand or pointer movable over the space over which the said member moves, and operating means connected with the said member for sliding the same backwardly and forwardly.

4. A recording scale including a casing adapted to receive a chart sheet and provided with a pocket having parallel longitudinal slots, a member movable backwardly and forwardly and having a plurality of punches located at the said slots, means for guiding the said member, weighing mechanism having a hand or pointer movable over the chart, and operating mechanism connected with the slidable member.

5. A recording scale including a frame or casing adapted to receive a chart sheet and provided with parallel guide rods, a slidable member mounted on the guide rods and provided at intervals with marking devices, operating means including an operating lever, and an angle lever connected with the operating lever and with the said member, weighing mechanism having a pointer or hand movable over the chart sheet.

6. A recording scale of the class described including a frame or casing adapted to receive a chart sheet, weighing mechanism comprising an angle lever having angularly related arms, one of the arms being provided with an adjustable weight, a pendent rod connected with the other arm, a hand or pointer carried by the weighing mechanism and movable over the chart sheet, and means movable over the chart sheet to position it contiguous to the pointer or hand for manually marking the chart sheet for indicating the weight thereon.

7. A recording scale including a frame or casing having a rectangular upper chart receiving portion and a lower portion or housing, means located within the upper portion of the frame or casing for holding a chart sheet, weighing mechanism mounted within the lower portion of the frame or casing and having a hand or pointer extending into the upper portion of the frame or casing and movable over the chart sheet, a series of marking devices movable over the chart sheet, and operating means for setting the marking devices with relation to the hand or pointer of the weighing mechanism.

In testimony whereof I affix my signature in presence of two witnesses.

EMIL P. QUIRAM.

Witnesses:
ALBERT KLANCKE,
M. J. QUIRAM.

Copies of this patent may be obtained for five cents each, by addressing the "Commissioner of Patents, Washington, D. C."